(12) United States Patent
Ray et al.

(10) Patent No.: US 11,182,124 B1
(45) Date of Patent: Nov. 23, 2021

(54) EXECUTION OF VOICE COMMANDS BY SELECTED DEVICES (71) Applicant: INTERNATIONAL BUSINESS MACHINES CORPORATION, Armonk, NY (US)

(72) Inventors: Shubhadip Ray, Secaucus, NJ (US); Robert Huntington Grant, Marietta, GA (US); Zachary A. Silverstein, Jacksonville, FL (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/880,182

(22) Filed: May 21, 2020

(51) Int. Cl.
G06F 3/16 (2006.01)
G06F 3/01 (2006.01)
G02B 27/00 (2006.01)
G02B 27/01 (2006.01)

(52) U.S. Cl.
CPC ......... *G06F 3/167* (2013.01); *G02B 27/0093* (2013.01); *G02B 27/0172* (2013.01); *G06F 3/013* (2013.01); *G06F 3/017* (2013.01); *G02B 2027/0178* (2013.01); *G02B 2027/0187* (2013.01)

(58) Field of Classification Search
CPC ..... G06F 3/167; G06F 3/013; G02B 27/0093; G02B 27/0172
USPC ......................................................... 345/633
See application file for complete search history.

(56) References Cited

U.S. PATENT DOCUMENTS

| 6,717,516 | B2 | 4/2004 | Bridgelall |
| 9,110,635 | B2 | 8/2015 | Knox et al. |
| 9,317,113 | B1 | 4/2016 | Karakotsios et al. |
| 10,057,748 | B1 | 8/2018 | Wolf et al. |
| 2018/0286403 | A1 | 10/2018 | Gruber |
| 2018/0365405 | A1* | 12/2018 | Mistry .................... G06F 3/017 |

(Continued)

OTHER PUBLICATIONS

Anonymous, "Augmented Reality Interface for Visualizing and Interacting with IoT Devices", IP.com Disclosure No. IPCOM000255233D, Sep. 11, 2018, 22 pages.

(Continued)

*Primary Examiner* — Hai Tao Sun
(74) *Attorney, Agent, or Firm* — Daniel Yeates; Andrew D. Wright; Roberts Calderon Safran & Cole, P.C.

(57) ABSTRACT

A method including: receiving, by a computing device from an AR device worn by a user, a definition of a region of inclusion that includes included controllable devices and excludes excluded controllable devices, the included controllable devices being ones of a plurality of controllable devices that are inside the region of inclusion, and the excluded controllable devices being ones of the controllable devices that are outside of the region of inclusion; receiving, by the computing device from the AR device, an indication of the user to adjust the region of inclusion; adjusting, by the computing device, the region of inclusion based on the indication of the user; sending, by the computing device, a definition of the adjusted region of inclusion to the AR device; and instructing, by the computing device, the AR device to display to the user the adjusted region of inclusion projected over the included controllable devices.

15 Claims, 8 Drawing Sheets (56) References Cited

U.S. PATENT DOCUMENTS

2019/0050195 A1    2/2019  Knox et al.
2019/0098070 A1*   3/2019  Kim ..................... G02B 27/01
2019/0139541 A1    5/2019  Andersen et al.
2019/0332250 A1*  10/2019  Lee ..................... G06F 1/1698

OTHER PUBLICATIONS

Newn et al., "AI-Mediated Gaze-Based Intention Recognition for Smart Eyewear: Opportunities & Challenges", In Adjunct Proceedings of the 2019 ACM International Joint Conference on Pervasive and Ubiquitous Computing and Proceedings of the 2019 ACM International Symposium on Wearable Computers (UbiComp/ISWC '19 Adjunct). ACM, 637-642, Sep. 9-13, 2019, 6 pages.

Mell et al., "The NIST Definition of Cloud Computing", NIST, Special Publication 800-145, Sep. 2011, 7 pages.

Murnane, "Augmented Reality Technology: A Student Creates The Closest Thing Yet To A Magic Ring", https://www.forbes.com/sites/kevinmurnane/2017/08/09/augmented-reality-technology-a-student-creates-the-closest-thing-yet-to-a-magic-ring/#1325994e3eaa, Consumer Tech, Aug. 9, 2017, 6 pages.

Elezaj, "What Does the Future Hold for Augmented Reality and Voice-Search", https://applift.com/blog/what-does-the-future-hold-for-augmented-reality-and-voice-search-2, Mobile Marketing, Jul. 30, 2018, 3 pages.

Wright, "Why It's Virtually Certain Augmented Reality Will Go Mainstream in 2018", http://www.smartcustomerservice.com/Columns/Vendor-Views/Why-Its-Virtually-Certain-Augmented-Reality-Will-Go-Mainstream-in-2018-123256.aspx, Genesys, Feb. 15, 2018, 5 pages.

* cited by examiner

EXECUTION OF VOICE COMMANDS BY SELECTED DEVICES

BACKGROUND

Aspects of the present invention relate generally to computer device control and, more particularly, to controlling selected computers using augmented reality.

Classrooms or other environments can have a plurality of computer devices that are at least partially controllable by an individual such as, for example, an instructor. In some situations, the instructor may want to control only a portion of the computer devices to direct only that portion of the computer devices to process a particular command.

SUMMARY

In a first aspect of the invention, there is a computer-implemented method including: receiving, by a computing device from an augmented reality (AR) device worn by a user, a definition of a region of inclusion, the region of inclusion including included controllable devices and excluding excluded controllable devices, the included controllable devices being ones of a plurality of controllable devices that are inside the region of inclusion, and the excluded controllable devices being ones of the plurality of controllable devices that are outside of the region of inclusion; receiving, by the computing device from the AR device, an indication of the user to adjust the region of inclusion; adjusting, by the computing device, the region of inclusion based on the indication of the user; sending, by the computing device, a definition of the adjusted region of inclusion to the AR device; and instructing, by the computing device, the AR device to display to the user the adjusted region of inclusion projected over the included controllable devices.

In another aspect of the invention, there is a computer program product including one or more computer readable storage media having program instructions collectively stored on the one or more computer readable storage media. The program instructions are executable to: receive from a wearable augmented reality (AR) device a definition of a region of inclusion, the region of inclusion including included controllable devices and excluding excluded controllable devices, the included controllable devices being ones of a plurality of controllable devices that are inside the region of inclusion, and the excluded controllable devices being ones of the plurality of controllable devices that are outside of the region of inclusion; receive from the AR device an indication of a user to adjust the region of inclusion; adjust the region of inclusion based on the indication of the user; send a definition of the adjusted region of inclusion to the AR device; and instruct the AR device to display to the user the adjusted region of inclusion projected over the included controllable devices.

In another aspect of the invention, there is a wearable augmented reality device including a processor, a computer readable memory, one or more computer readable storage media, and program instructions collectively stored on the one or more computer readable storage media. The program instructions are executable to: define a region of inclusion, the region of inclusion including included controllable devices and excluding excluded controllable devices, the included controllable devices being ones of a plurality of controllable devices that are inside the region of inclusion, and the excluded controllable devices being ones of the plurality of controllable devices that are outside of the region of inclusion; receive an indication from a user that indicates an adjustment to the region of inclusion; adjust the region of inclusion based on the indication from the user; display, by the wearable augmented reality device, to the user the adjusted region of inclusion projected over the included controllable devices; and instruct only the included controllable devices in the adjusted region of inclusion to execute a command issued by the user.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to computer device control and, more particularly, to controlling selected computers using augmented reality. According to aspects of the invention a user wearing an augmented reality (AR) device defines a region of inclusion that includes less than all of a plurality of controllable computer devices within a control range of the user. In embodiments, the user indicates through, for example, a finger gesture or an eye movement a change to the region of inclusion to narrow the user's execution of a command by only those controllable computer devices that are in the region of inclusion. In this manner, implementations of the invention provide the user with the ability to select which one or ones of the controllable computer devices will execute the user's command, and provide the user with a visualization of the region of inclusion through the AR device.

In embodiments, while submitting any voice command, a user visualizes in augmented reality glasses a region of inclusion or "cone of control" where devices will execute the voice command. With a predefined eye gesture, the user controls the angle of the cone of control and, accordingly, the devices present within the cone of control will execute the voice command.

Embodiments perform machine learning using the following parameters to create a knowledge corpus: historical learning about context of a voice command; the user's relative position and direction of focus while submitting the voice command; and selection of an angle of the cone of control. Based on the knowledge corpus, when a voice command is submitted, the artificial intelligence (AI) based augmented reality (AR) device (for example, AR glasses) predicts the angle of the cone of control and shows the same to the user in the AR device.

In embodiments, controllable devices present in the area near the user receive the voice command from the user and also receive the cone of control information from the paired AR device to identify if the controllable device is present within the cone of control shown in the AR device. If the controllable device is in the cone of control, the voice command is executed by the controllable device.

In embodiments, multiple users collaborate with each other to create multiple cones of control in different directions and/or overlapping cone of control areas in any surrounding. Accordingly, different voice commands will be executed by the controllable devices present in different cones of control. In embodiments, while the AR device displays the cone of control to the user, the user alters the shape of the cone of control with an eye and/or finger gesture and accordingly selects the controllable devices which will execute the voice command.

Implementations of the invention have a practical application of providing a user the ability to utilize an AR device to define a subset of computer devices to control via voice command. Implementations of the invention are an improvement to the functioning of a computer for at least the reason that they implement an augmented reality device to project a region of inclusion over a plurality of devices that communicate with the augmented reality device.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
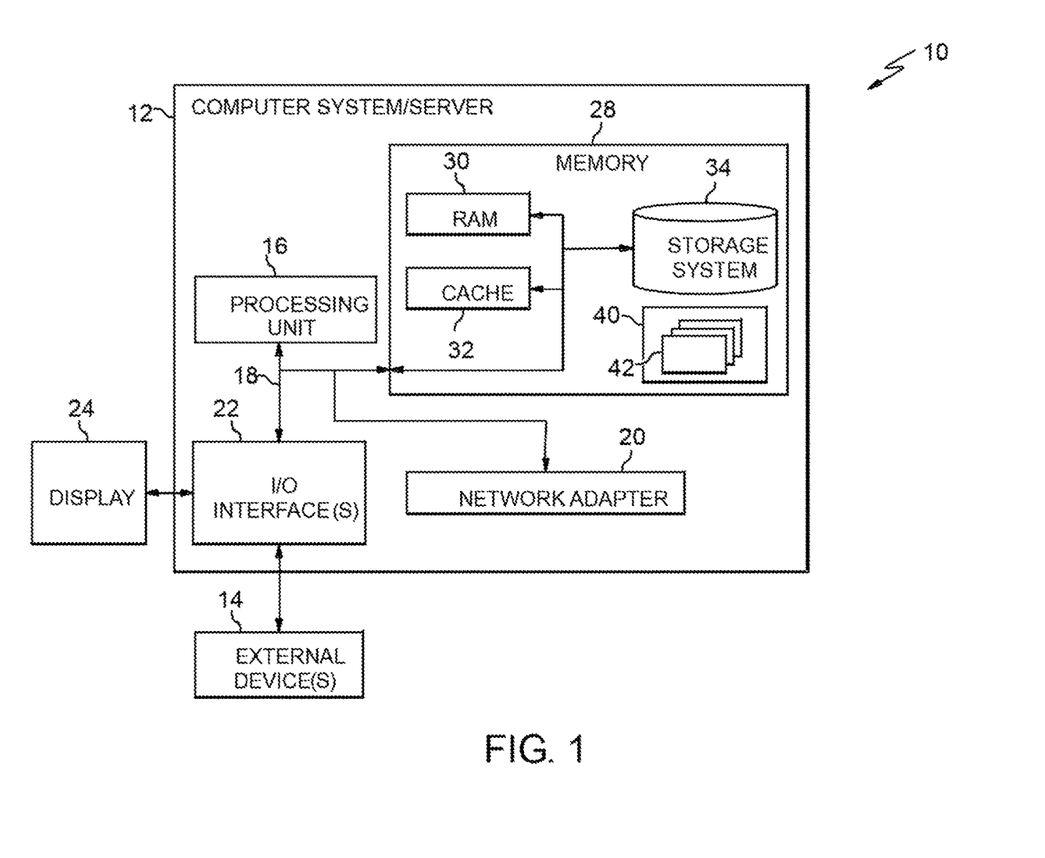
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
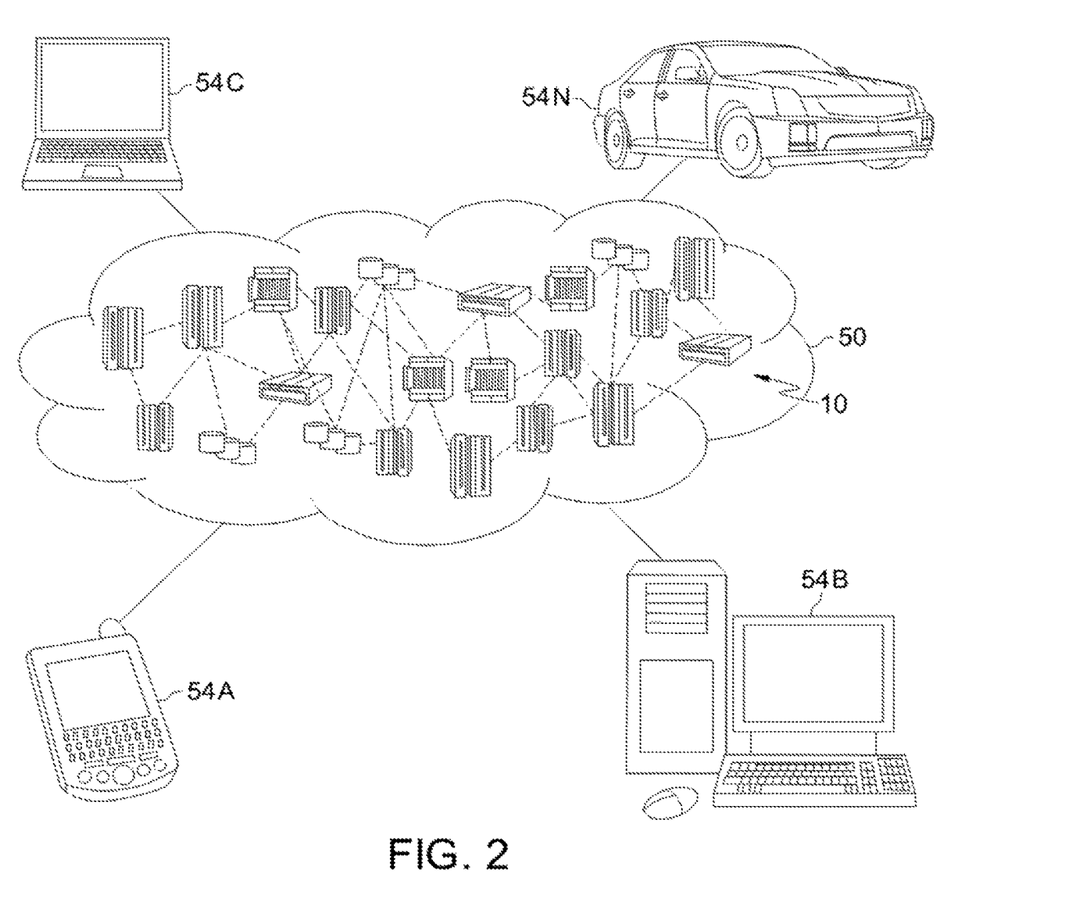
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
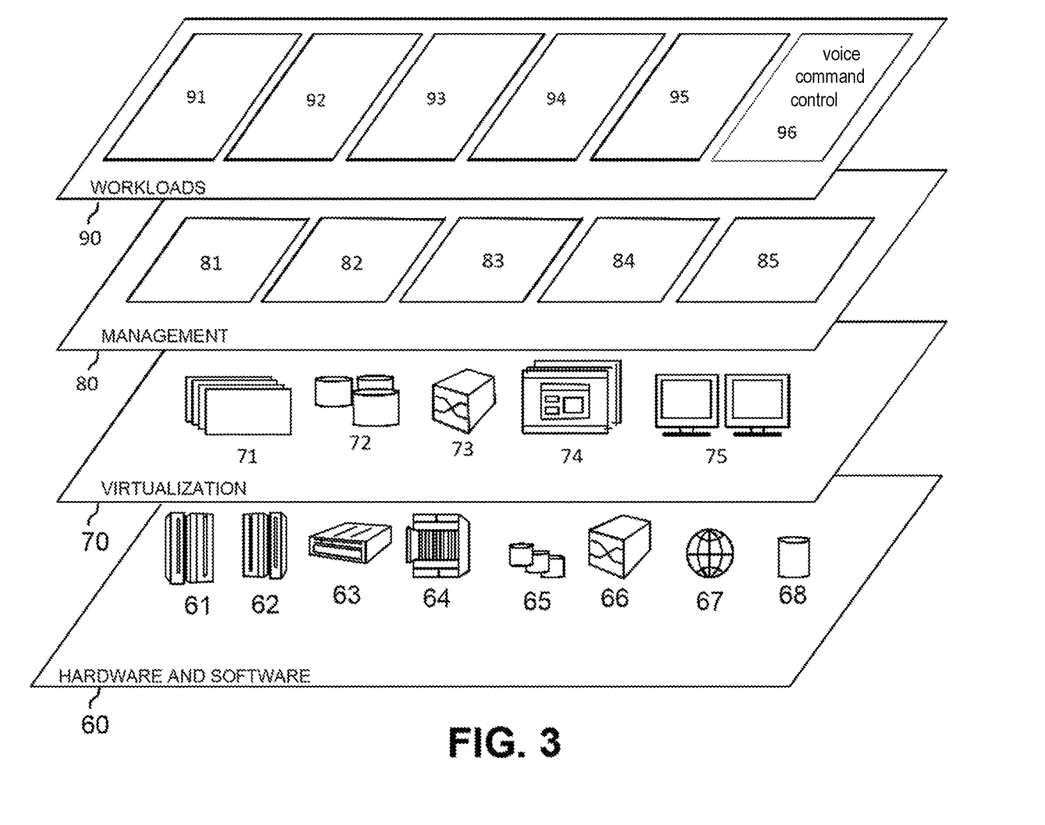
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and voice command control 96.

Implementations of the invention may include a computer system/server 12 of FIG. 1 in which one or more of the program modules 42 are configured to perform (or cause the computer system/server 12 to perform) one of more functions of the voice command control 96 of FIG. 3. For example, the one or more of the program modules 42 may be configured to: receive from an augmented reality (AR) device worn by a user, a definition of a region of inclusion, the region of inclusion including included controllable devices and excluding excluded controllable devices, the included controllable devices being ones of a plurality of controllable devices that are inside the region of inclusion, and the excluded controllable devices being ones of the plurality of controllable devices that are outside of the region of inclusion; receive from the AR device, an indication of the user to adjust the region of inclusion; adjust the region of inclusion based on the indication of the user; send a definition of the adjusted region of inclusion to the AR device; and instruct the AR device to display to the user the adjusted region of inclusion projected over the included controllable devices.

Embodiments of the invention use augmented reality in a system to selectively submit a voice request to one or more devices in a multi-device environment. In embodiments, a user controls the angle and shape of a "cone of control" through augmented reality glasses and, accordingly, selects appropriate candidate devices where the voice request is executed.

Because sound is often omnidirectional, a voice command that is received by any device that is capable of hearing the command and is within the audible range of the command will execute the command. As a result, when a voice command is issued in a multi-device environment there can be ambiguity as to which device or devices are to execute the voice command. In some environments, to resolve the ambiguity, devices are uniquely named, which requires the user to state a device name along with voice command. However, in many situations the user may not be able to remember/recall the device name, and/or multiple devices are to be controlled. To address this problem, embodiments include methods and systems by which a user uses augmented reality glasses to define a region of inclusion (for example, a cone of control) of a voice command and accordingly only those devices located within the cone of control execute the voice command.

In this disclosure, the terms region of inclusion and cone of control are used interchangeably. While many of the examples use a cone of control, other examples use a region of inclusion of a different shape. In this disclosure, the term voice command is understood to represent voice commands as well as other types of commands. While many of the examples refer to the command being a voice command, in other examples the command is a command such as, for example, a finger or eye gesture induced command, a button induced command, or some other type of command.

In embodiments, while submitting a voice command, a user visualizes a region of inclusion such as, for example, a "cone of control", in an augmented reality (AR) device such as, for example, AR glasses. The cone of control is a region in which the voice command will be executed by controllable devices such as, for example, computers. The user controls the angle of the cone of control with a gesture such as, for example, a predefined eye or finger gesture, and accordingly changes which devices are included in the cone of control.

Embodiments use historical learning about the context of a voice command, the user's relative position and direction of focus while submitting the voice command, and the user's selection of the angle of the cone of control. In embodiments, machine learning is performed to create a knowledge corpus which is referenced to predict the appropriate (or at least a starting) angle for the cone of control when a voice command is submitted that matches, or is sufficiently similar to, a voice command in the knowledge corpus.

In embodiments, devices, for example computer devices, present in the area near or surrounding the user receive the voice command from the user and also receive the cone of control information from the paired AR device to identify if the particular device is within the cone of control shown to the user in the AR device. If the particular device both receives the voice command and determines that it is within the cone of control based in the cone of control information, the particular device executes the voice command.

In embodiments, multiple users collaborate with each other to create multiple cones of control in different directions, or overlapping cones of control. Accordingly, the various devices execute different voice commands based on the cone(s) of control in which they are present. In embodiments, while the AR device displays the cone of control to the user, the user can alter the shape of the cone of control with an eye gesture and/or a finger gesture and accordingly select the devices on which the voice command is to be executed.

Figure 4:
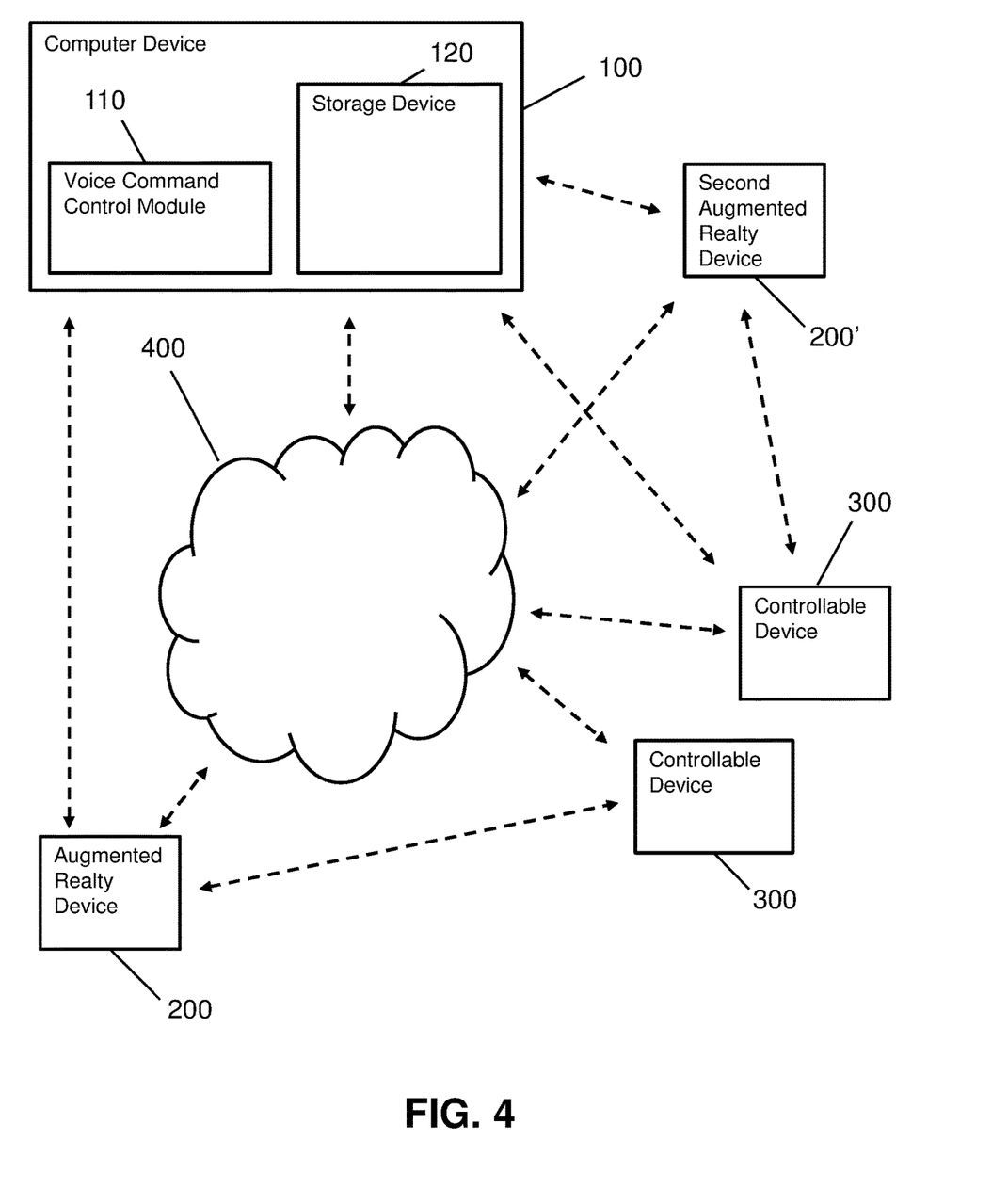
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 400 such as, for example, cloud computing environment 50. In this example, computer device 100 includes a voice command control module 110, for example, one or more of program modules 42 in FIG. 1, and a storage device 120 such as, for example, storage system 34 in FIG. 1.

FIG. 4 shows an AR device 200 that is, in some embodiments, AR glasses or some other AR device that is worn by a user. FIG. 4 also shows a second AR device 200' that is, in some embodiments, AR glasses or some other AR device that is worn by a second user. FIG. 4 shows two controllable devices 300 such as, for example, other computer devices having some or all of the features of computer system/server 12 in FIG. 1, that are external to computer device 100 and contains programs and/or data that voice command control module 110 accesses. Other examples include fewer or more than two controllable devices 300.

In embodiments, computer device 100 comprises voice command control module 110, which may comprise one or more program modules such as program modules 42 described with respect to FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In some embodiments shown in FIG. 4, computer device 100 communicates with AR device 200 and/or controllable devices 300 through network 400. In other embodiments, computer device 100 communicates directly with AR device 200 and/or controllable devices 300. In some embodiments shown in FIG. 4, computer device 100 communicates with AR device 200' and/or controllable devices 300 through network 400. In other embodiments, computer device 100 communicates directly with AR device 200' and/or controllable devices 300.

Figure 5:
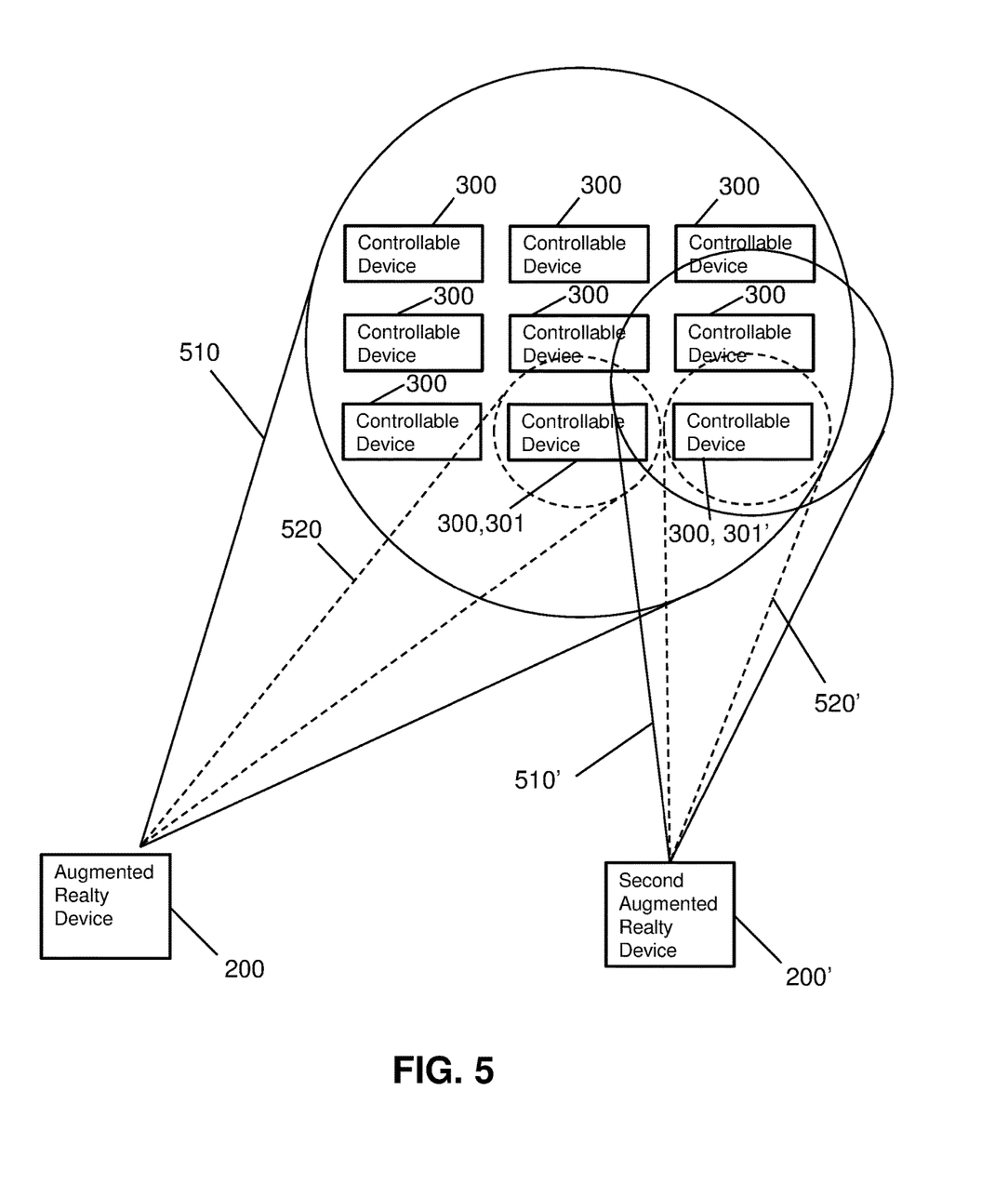
FIG. 5 shows an exemplary embodiment of the present invention.

FIG. 5 shows an example of embodiments in which AR device 200 and second AR device 200' communicate with different pluralities of controllable devices 300 to define which of controllable devices 300 are to execute a voice command issued by a user wearing AR device 200 and a voice command issued by a second user of second wearable AR device 200'. In this example, AR device 200 creates a region of inclusion (or cone of control) 510 that includes nine controllable devices 300. In some situations, the user wishes to execute the voice command on fewer than all controllable devices 300. In such a situation, the user makes an indication such as, for example, a finger gesture or eye gesture to indicate that the user wants to change the size of region of inclusion 510. In embodiments, AR device 200 detects the indication made by the user and AR device 200 and/or voice command control module 110 interprets the indication as a request by the user to increase or decrease the size of region of inclusion 510. In the example shown in FIG. 5, AR device 200 and/or voice command control module 110 interprets the indication made by the user as a request to reduce the size of region of inclusion 510 to an adjusted region of inclusion 520. As shown in FIG. 5, adjusted region of inclusion 520 includes only one controllable device 301. In this example, only controllable device 301 will execute a voice command issued by the user because controllable device 301 is the only controllable device of the plurality of controllable devices 300 that is located in adjusted region of inclusion 520. In other examples, two or more of controllable devices 300 are located in an adjusted region of inclusion. In embodiments, where the region of inclusion and the adjusted region of inclusion are cones, a half angle of the adjusted region of inclusion is different from a half angle of the region of inclusion.

In the example shown in FIG. 5, second AR device 200' creates a second region of inclusion (or cone of control) 510' that includes two controllable devices 300. In some situations, the second user wishes to execute the voice command on fewer than all controllable devices 300 in second region of inclusion 510'. In such a situation, the second user makes an indication such as, for example, a finger gesture or eye gesture to indicate that the second user wants to change the size of second region of inclusion 510'. In embodiments, second AR device 200' detects the indication made by the second user and second AR device 200' and/or voice command control module 110 interprets the indication as a request by the second user to increase or decrease the size of second region of inclusion 510'. In the example shown in FIG. 5, second AR device 200' and/or voice command control module 110 interprets the indication made by the second user as a request to reduce the size of second region of inclusion 510' to a second adjusted region of inclusion 520'. As shown in FIG. 5, second adjusted region of inclusion 520' includes only one controllable device 301'. In this example, only controllable device 301' will execute a voice command issued by the second user because controllable device 301' is the only controllable device of the plurality of controllable devices 300 that is located in adjusted region of inclusion 520'. In other examples, two or more of controllable devices 300 are located in a second adjusted region of inclusion. In embodiments, where the second region of inclusion and the second adjusted region of inclusion are cones, a half angle of the second adjusted region of inclusion is different from a half angle of the second region of inclusion.

In the example shown in FIG. 5, multiple users (the user and the second user) collaborate with each other to create multiple regions of inclusion (510, 510') in different directions and/or overlapping region of inclusion areas in any surrounding. Accordingly, different voice commands (or the same voice command) will be executed by the controllable devices present in different regions of inclusion. In embodiments, while AR device 200 and second AR device 200' display the regions of inclusion 510, 510' to the user and the second user, the user and the second user independently alter the shapes of the regions of inclusion 510' 510' with an eye and/or finger gesture and accordingly select the controllable devices 300 which will execute the respective voice commands.

In embodiments, AR device 200, for example AR glasses, includes software which projects light onto the retina of a user wearing AR device 200 to create an image of a cone on AR device 200. This cone is based on a cone-shaped field of view of the user. In embodiments, a predefined eye-based gesture, for example, such as an opening pattern of the eye adjusts the cone projected on AR device 200. For example, AR device 200 and/or voice command control module 110 interprets the user opening their eye to a more open position as an indication that the user desires the image of the cone to be made larger, encompassing more area. Similarly, AR device 200 and/or voice command control module 110 interprets the user closing their eye to a less open position as an indication that the user desires the image of the cone (region of inclusion 510) to be made smaller, encompassing less area. In embodiments, AR device 200 and/or voice command control module 110 interprets the user opening their fingers to a more open position as an indication that the user desires the image of the cone to be made larger, encompassing more area. Similarly, in embodiments, AR device 200 and/or voice command control module 110 interprets the user closing their fingers to a less open position as an indication that the user desires the image of the cone to be made smaller, encompassing less area. The user then sees adjusted region of inclusion 520 in AR device 200, with the direction and angular orientation of the cone depending on the user's head position, direction, etc.

In embodiments, devices, such as controllable devices 300, present in the vicinity of AR device 200 (such as in a classroom, auditorium, etc.) have voice interaction capability. In embodiments, an artificial intelligence (AI) voice response section of, for example, voice command control module 110 receives the voice command from the user (through device 200) and receives the location of adjusted region of inclusion 520 that is displayed in AR device 200. In embodiments, AR device 200 uses adjusted region of inclusion 520 as a boundary for determining which controllable devices 300 (for example, controllable device 301 in FIGS. 5 and 6) are to execute the voice command of the user. In embodiments, AR device 200 determines which controllable devices 300 are to execute the voice command of the user by identifying which controllable devices 300 (for example, controllable device 301 in FIGS. 5 and 6) are present within adjusted region of inclusion 520 (the cone of control). An example of how AR device 200 determines which controllable devices 300 are to execute the voice command is shown below in FIGS. 6 and 7. In one embodiment, the location of controllable devices 300 is determined using direction based device recognition. An example of direction based device recognition includes a plurality of fixed devices that operate as radio frequency identification (RFID) readers that locate, for example, controllable devices 300 be reading an RFID tag attached to each controllable device 300.

In embodiments, AR device 200 displays region of inclusion 510 to the user and AR device 200 (or in some embodiments, voice command control module 110) adjusts region of inclusion 510 to adjusted region of inclusion 520 as a result of the user making an indication. Accordingly, the ones of controllable devices 300 that are within adjusted region of inclusion 520 (and as a result execute the command of the user) may be different from the ones of controllable devices 300 that are within region of inclusion 510.

In embodiments, controllable devices 300 receive the voice command of the user and communicate with AR device 200 to determine if they are included in region of inclusion 510 (or adjusted region of inclusion 520). In embodiments, as a result of a particular controllable device 300, such as controllable device 301, receiving the voice command and being in region of inclusion 510 (or adjusted region of inclusion 520), that particular controllable device 301 executes the voice command.

In embodiments, voice command control module 110 uses machine learning to gather and store (on storage device 120, for example) historical data such as, for example, a user's voice command, the user's relative position while submitting that voice command, the size of adjusted region of inclusion 520 (the angle of the cone of control, for example), and other data related to the location and size of adjusted region of inclusion 520 when that particular command was issued. In embodiments, voice command module 110 uses this data to create a knowledge corpus that voice command control module 110 uses to predict what size (angle of the cone of control, for example) region of inclusion should be used for a given future voice command. For example, when a given voice command is repeated in the future, voice command control module 110 instructs AR device 200 to use adjusted region of inclusion 520 as a starting point for the user issuing the voice command.

In embodiments, voice command control module 110 creates multiple regions of inclusion resulting from multiple AR devices 200 being used by multiple users such that each AR device 200 controls the specific controllable devices 300 in its region of inclusion.

In embodiments, voice command control module 110 (and/or AR device 200) creates and and/or recognizes three dimensional coordinates of the various controllable devices 300, the room in which the controllable devices are present, and region of inclusion 510, 520. Voice command control module 110 (and/or AR device 200) uses these three-dimensional coordinates to determine the relative positions of the various controllable devices 300 and region of inclusion 510, 520.

Figure 6:
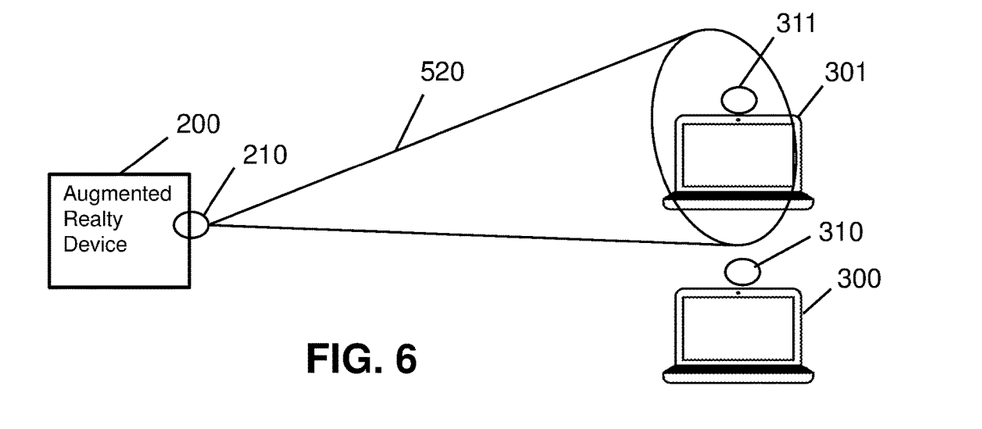
FIG. 6 shows an exemplary embodiment of the present invention.

FIG. 6 shows an embodiment in which controllable device 300 includes a light sensor 310 and controllable device 301 includes a light sensor 311. An example of the embodiment shown in FIG. 6 is described by the flow chart of FIG. 7.

Figure 7:
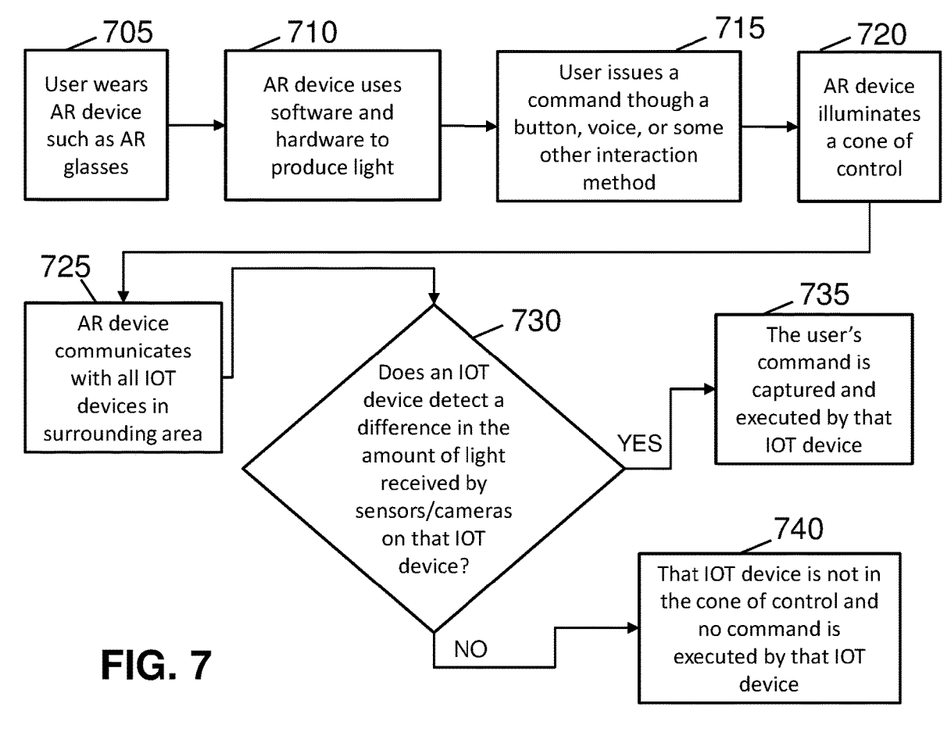
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIGS. 4-6.

At step 705, the user wears an AR device such as AR glasses. In embodiments, and as described with respect to FIGS. 4-6, a user wears AR device 200. At step 710, the AR device uses software and hardware to produce light. In embodiments, and as described with respect to FIGS. 4-6, AR device 200 uses software in AR device 200 to produce light that is to be projected from a light emitter 210 of AR device 200.

At step 715, the user issues a command through a button, voice, or some other interaction method. In embodiments, and as described with respect to FIGS. 4-6, the user issues a voice command that is received by controllable devices 300, 301. At step 720, the AR device illuminates a cone of control. In embodiments, and as described with respect to FIGS. 4-6, AR device 200 illuminates adjusted region of inclusion 520 by emitting light from light emitter 210 in the form of a cone.

At step 725, the AR device communicates with all Internet of things (IOT) devices in an area surrounding the user. In embodiments, and as described with respect to FIGS. 4-6, AR device 200 communicates with all controllable devices 300 in a room in which the user is located. In embodiments, the communication between AR device 200 and controllable devices 300 is a direct, wireless communication. In other embodiments, the communication between AR device 200 and controllable devices 300 passes through voice command control module 110 by way of network 200. In step 725, controllable devices 300 are IOT devices. In other examples, some or all of controllable devices 300 are devices other than IOT devices.

At step 730, a particular one of the IOT devices determines whether or not it detects a difference in an amount of light received by a sensor or camera on the particular IOT device. In embodiments, and as described with respect to FIGS. 4-6, light detector 311 of controllable device 301 detects a change in the light received by light detector 311, and processing continues to step 735. The change in the amount of light received indicates that controllable device 301 is in adjusted region of inclusion 520 due to the light emitted in step 720. In this example, light detector 310 of controllable device 300 does not detect a change in the light received by light detector 310, and processing continues to step 740.

At step 735, the users command is captured and executed by the particular IOT device. In embodiments, and as described with respect to FIGS. 4-6, controllable device 301 captures the user's command issued in step 715 and controllable device 301 executes the command because controllable device 301 is located in adjusted region of inclusion 520. Controllable device 301 determines that it is in adjusted region of inclusion 520 because light sensor 311 detects a difference in light at step 730. At step 740, the particular IOT device is not in the cone of control and no command is executed by the particular IOT device. In embodiments, and as described with respect to FIGS. 4-6, controllable device 300 captures the user's command issued in step 715 but controllable device 300 does not execute the command because controllable device 300 is located outside of adjusted region of inclusion 520. Controllable device 300 determines that it is outside of adjusted region of inclusion 520 because light sensor 310 does not detect a difference in light at step 730.

Figure 8:
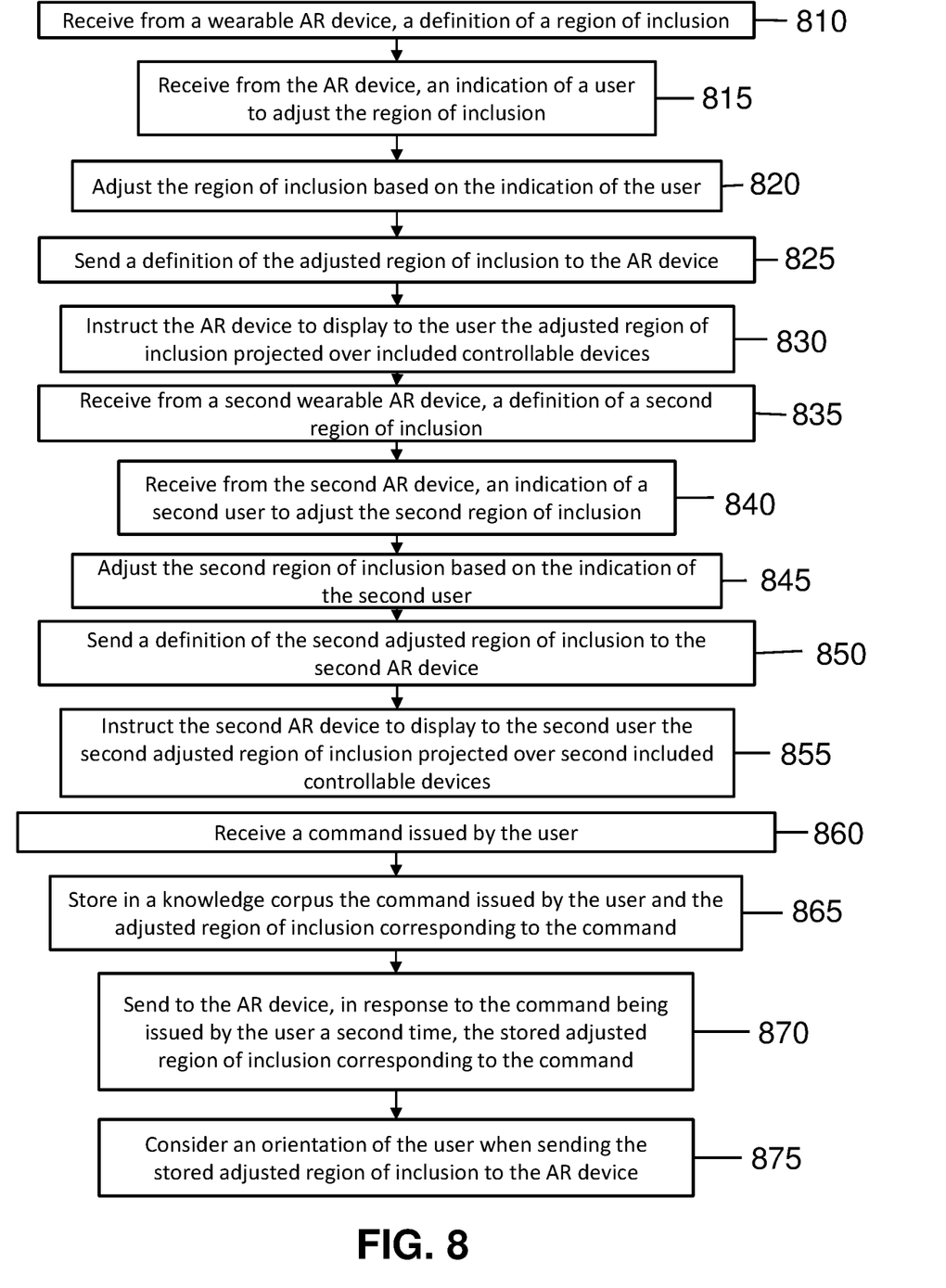
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 4 and are described with reference to elements depicted in FIGS. 4-6.

At step 810, the system receives from a wearable AR device, a definition of a region of inclusion. In embodiments, and as described with respect to FIGS. 4-6, voice command control module 110 receives from AR device 200 a definition of region of inclusion 510.

At step 815, the system receives from the AR device, an indication of the user to adjust the region of inclusion. In embodiments, and as described with respect to FIGS. 4-6, voice command control module 110 receives from AR device 200 an indication of the user to adjust region of inclusion 510.

At step 820, the system adjusts the region of inclusion based on the indication of the user. In embodiments, and as described with respect to FIGS. 4-6, voice command control module 110 adjusts region of inclusion 510 to adjusted region of inclusion 520 based on the indication of the user.

At step 825, the system sends a definition of the adjusted region of inclusion to the AR device. In embodiments, and as described with respect to FIGS. 4-6, voice command control module 110 sends a definition of adjusted region of inclusion 520 to AR device 200.

At step 830, the system instructs the AR device to display to the user the adjusted region of inclusion projected over included controllable devices. In embodiments, and as described with respect to FIGS. 4-6, voice command control module 110 instructs AR device 200 to display, to the user, adjusted region of inclusion 520 projected over controllable device 301.

At step 835, the system receives from a second wearable AR device, a definition of a second region of inclusion. In embodiments, and as described with respect to FIGS. 4-6, voice command control module 110 receives from second AR device 200' a definition of second region of inclusion 510'.

At step 840, the system receives from the second AR device, an indication of the second user to adjust the second region of inclusion. In embodiments, and as described with respect to FIGS. 4-6, voice command control module 110 receives from second AR device 200' an indication of the second user to adjust second region of inclusion 510'.

At step 845, the system adjusts the second region of inclusion based on the indication of the second user. In embodiments, and as described with respect to FIGS. 4-6, voice command control module 110 adjusts second region of inclusion 510' to adjusted second region of inclusion 520' based on the indication of the second user.

At step 850, the system sends a definition of the second adjusted region of inclusion to the second AR device. In embodiments, and as described with respect to FIGS. 4-6, voice command control module 110 sends a definition of second adjusted region of inclusion 520' to second AR device 200'.

At step 855, the system instructs the second AR device to display to the second user the second adjusted region of inclusion projected over second included controllable devices. In embodiments, and as described with respect to FIGS. 4-6, voice command control module 110 instructs second AR device 200' to display, to the second user, second adjusted region of inclusion 520' projected over controllable device 301'.

At step 860, the system receives a command issued by the user. In embodiments, and as described with respect to FIGS. 4-6, voice command control module 110 receives a command issued by the user.

At step 865, the system stores in a knowledge corpus the command issued by the user and the adjusted region of inclusion corresponding to the command. In embodiments, and as described with respect to FIGS. 4-6, voice command control module 110 stores in a knowledge corpus on storage device 120 the command issued by the user and adjusted region of inclusion 520 corresponding to the command.

At step 870, the system sends to the AR device, in response to the command being issued by the user a second time, the stored adjusted region of inclusion corresponding to the command. In embodiments, and as described with respect to FIGS. 4-6, voice command control module 110 sends to AR device 200, in response to the command being issued by the user a second time, the stored adjusted region of inclusion 520 corresponding to the command.

At step 875, the system considers an orientation of the user when sending the stored adjusted region of inclusion to the AR device. In embodiments, and as described with respect to FIGS. 4-6, voice command control module 110 considers an orientation of the user when sending the stored adjusted region of inclusion 520 to AR device 200 in step 825.

Figure 9:
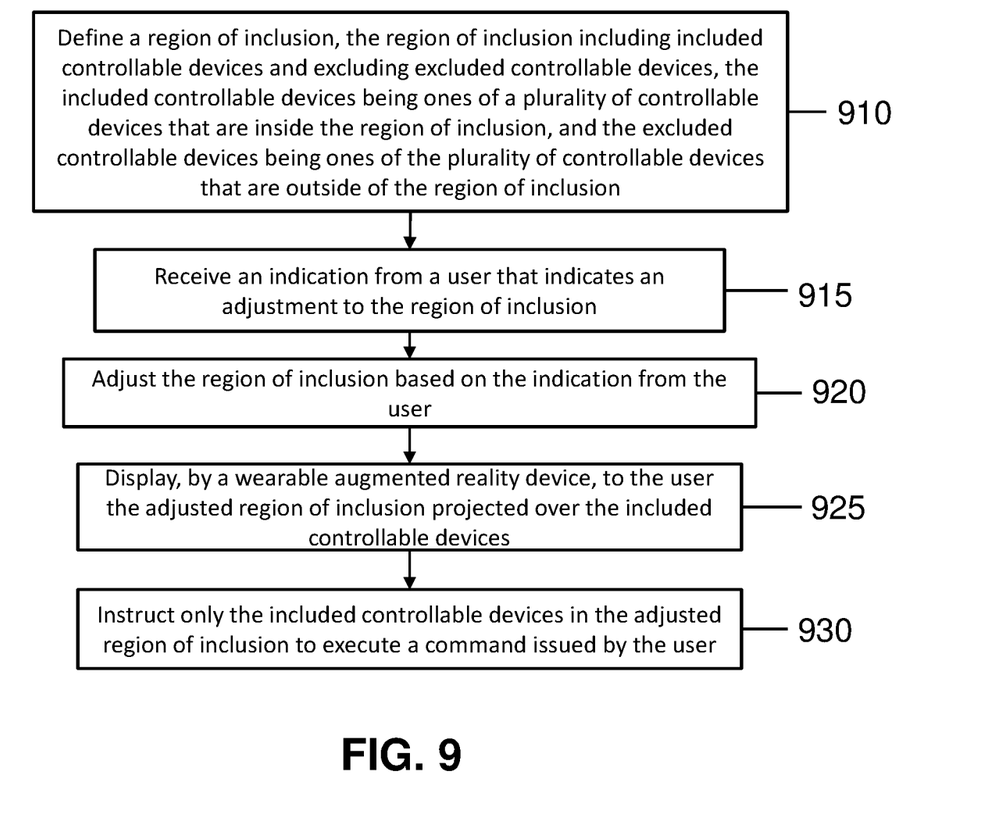
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 4 and are described with reference to elements depicted in FIGS. 4-6.

At step 910, the system defines a region of inclusion, the region of inclusion including included controllable devices and excluding excluded controllable devices, the included controllable devices being ones of a plurality of controllable devices that are inside the region of inclusion, and the excluded controllable devices being ones of the plurality of controllable devices that are outside of the region of inclusion. In embodiments, and as described with respect to FIGS. 4-6, AR device 200 defines region of inclusion 510, the region of inclusion including included controllable devices 300 and excluding excluded controllable devices (none in FIG. 5), included controllable devices 300 being ones of the plurality of controllable devices 300 that are inside region of inclusion 510, and the excluded controllable devices being ones of the plurality of controllable devices 300 that are outside of region of inclusion 510 (none in FIG. 5).

At step 915, the system receives an indication from a user that indicates an adjustment to the region of inclusion. In embodiments, and as described with respect to FIGS. 4-6, AR device 200 receives an indication from the user that indicates an adjustment to region of inclusion 510.

At step 920, the system adjusts the region of inclusion based on the indication from the user. In embodiments, and as described with respect to FIGS. 4-6, AR device 200 adjusts region of inclusion 510 based on the indication from the user.

At step 925, the system displays, by a wearable AR device, to the user the adjusted region of inclusion projected over the included controllable devices. In embodiments, and as described with respect to FIGS. 4-6, AR device 200 displays to the user adjusted region of inclusion 520 projected over included controllable device 301.

At step 930, the system instructs only the included controllable devices in the adjusted region of inclusion to execute a command issued by the user. In embodiments, and as described with respect to FIGS. 4-6, AR device 200 transmits information defining adjusted region of inclusion 520 and the information is received by one or more of controllable devices 300. In one embodiment, AR device 200 broadcasts data defining adjusted region of inclusion 520, and each controllable device 300 that receives the data determines whether it is in adjusted region of inclusion 520 by comparing its location to the data defining adjusted region of inclusion 520. In another embodiment, each controllable device 300 determines if it is in adjusted region of inclusion 520 by detecting, or not detecting, a difference in an amount of light received by sensor 310, 311 on the particular controllable device 300. In both embodiments, respective ones of the controllable devices execute the voice command issued by the user only when both conditions are satisfied: (i) the controllable device is determined to be in the adjusted region of inclusion, and (ii) the controllable device received the voice command. In this manner AR device 200 instructs only controllable device 301 in adjusted region of inclusion 520 to execute a command issued by the user.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device from an augmented reality (AR) device worn by a user, a definition of a region of inclusion, the region of inclusion including included controllable devices and excluding excluded controllable devices, the included controllable devices being ones of a plurality of controllable devices that are inside the region of inclusion, and the excluded controllable devices being ones of the plurality of controllable devices that are outside of the region of inclusion;
receiving, by the computing device from the AR device, an indication of the user to adjust the region of inclusion;
receiving, by the computing device, a command issued by the user;
adjusting, by the computing device, the region of inclusion based on the indication of the user;
storing, by the computing device, in a knowledge corpus the command issued by the user and the adjusted region of inclusion corresponding to the command;
sending, by the computing device, a definition of the adjusted region of inclusion to the AR device; and
instructing, by the computing device, the AR device to display to the user the adjusted region of inclusion projected over the included controllable devices,
wherein the command issued by the user is an audible command.

2. The method of claim 1, wherein the region of inclusion is a cone-shaped region diverging from the AR device.

3. The method of claim 2, wherein the adjusted region of inclusion has a half angle that is different from a half angle of the region of inclusion.

4. The method of claim 1, wherein the AR device is a pair of AR glasses.

5. The method of claim 1, wherein the controllable devices are computer devices located in a room.

6. The method of claim 1, further comprising:
receiving, by the computing device and from a second wearable AR device, a definition of a second region of inclusion, the second region of inclusion including second included controllable devices and excluding second excluded controllable devices, the second included controllable devices being ones of the plurality of controllable devices that are inside the second region of inclusion, and the second excluded controllable devices being ones of the plurality of controllable devices that are outside of the second region of inclusion;

receiving, by the computing device and from the second AR device, an indication of a second user to adjust the second region of inclusion;

adjusting, by the computing device, the second region of inclusion based on the indication of the second user;

sending, by the computing device, a definition of the second adjusted region of inclusion to the second AR device; and instructing, by the computing device, the second AR device to display to the second user the second adjusted region of inclusion projected over the second included controllable devices.

7. The method of claim 6, wherein the second region of inclusion overlaps the region of inclusion.

8. The method of claim 1, further comprising sending to the AR device, by the computing device and in response to the command being issued by the user a second time, the stored adjusted region of inclusion corresponding to the command.

9. The method of claim 8, further comprising considering, by the computing device, an orientation of the user when sending the stored adjusted region of inclusion to the AR device.

10. A wearable augmented reality device comprising:

a processor, a computer readable memory, one or more computer readable storage media, and program instructions collectively stored on the one or more computer readable storage media, the program instructions executable to:

define a region of inclusion, the region of inclusion including included controllable devices and excluding excluded controllable devices, the included controllable devices being ones of a plurality of controllable devices that are inside the region of inclusion, and the excluded controllable devices being ones of the plurality of controllable devices that are outside of the region of inclusion;

receive an indication from a user that indicates an adjustment to the region of inclusion;

receive a command issued by the user;

adjust the region of inclusion based on the indication from the user;

display, by the wearable augmented reality device, to the user the adjusted region of inclusion projected over the included controllable devices;

instruct only the included controllable devices in the adjusted region of inclusion to execute the command issued by the user; and store in a knowledge corpus the command issued by the user and the adjusted region of inclusion corresponding to the command, wherein the command issued by the user is an audible command.

11. The device of claim 10, wherein the indication from the user is a finger gesture by the user that indicates a change in size of the region of inclusion.

12. The device of claim 10, wherein the indication from the user is an eye gesture by the user that indicates a change in size of the region of inclusion.

13. A computer program product comprising one or more computer readable storage media having program instructions collectively stored on the one or more computer readable storage media, the program instructions executable to:

receive from a wearable augmented reality (AR) device a definition of a region of inclusion, the region of inclusion including included controllable devices and excluding excluded controllable devices, the included controllable devices being ones of a plurality of controllable devices that are inside the region of inclusion, and the excluded controllable devices being ones of the plurality of controllable devices that are outside of the region of inclusion;

receive from the AR device an indication of a user to adjust the region of inclusion;

adjust the region of inclusion based on the indication of the user;

send a definition of the adjusted region of inclusion to the AR device;

instruct the AR device to display to the user the adjusted region of inclusion projected over the included controllable devices;

receive from a second wearable AR device a definition of a second region of inclusion, the second region of inclusion including second included controllable devices and excluding second excluded controllable devices, the second included controllable devices being ones of the plurality of controllable devices that are inside the second region of inclusion, and the second excluded controllable devices being ones of the plurality of controllable devices that are outside of the second region of inclusion;

receive from the second AR device an indication of a second user to adjust the second region of inclusion;

adjust the second region of inclusion based on the indication of the second user;

send a definition of the second adjusted region of inclusion to the second AR device; and instruct the second AR device to display to the second user the second adjusted region of inclusion projected over the second included controllable devices.

14. The computer program product of claim 13, wherein the AR device is a pair of AR glasses, and the controllable devices are computer devices located in a room.

15. The computer program product of claim 13, wherein the indication of the user is a finger gesture by the user that indicates a change in size.

\* \* \* \* \*